Dec. 18, 1928.

E. B. NOWOSIELSKI

ELECTRICAL CONDENSER

Filed Jan. 2, 1925

1,695,778

INVENTOR
EDWARD B. NOWOSIELSKI
BY
R. D. T. Libby
ATTORNEY

Patented Dec. 18, 1928.

1,695,778

UNITED STATES PATENT OFFICE.

EDWARD B. NOWOSIELSKI, OF BLOOMFIELD, NEW JERSEY, ASSIGNOR TO SPLITDORF ELECTRICAL COMPANY, OF NEWARK, NEW JERSEY.

ELECTRICAL CONDENSER.

Application filed January 2, 1925. Serial No. 269.

This invention relates to improvements in electrical condensers of the type wherein a pile of alternate layers of mica and metal foil is assembled into a stack of variable thickness and which is clamped together by clamping members which also constitute electrical terminals as well as means for mounting the condenser.

A condenser of the general character described above is disclosed in Van Deventer Patent 1,181,623 issued May 2, 1916.

In condensers of this type after a certain predetermined number of layers of insulating sheets and conducting sheets have been assembled so as to give the desired capacity, the condenser is finished by applying stiffening members to opposite sides of the stack and then slipping the terminal clamps over the edge of the pile after which the clamps are squeezed under pressure so as to compact the stack and retain the elements in their compressed condition. If desired, an identifying strip of paper or other material may be placed at the top beneath a transparent covering film such as a strip of mica. The whole condenser may then be impregnated and baked in a suitable oven. The width of the clamps is preferably substantially the same as the width of the condenser and they may extend toward each other to any desired distance to give the proper clamping result.

In order to insure that the clamps may not be pulled off the stack accidentally or otherwise, I have provided means for preventing this trouble; hence, the principal object of my invention is to provide means for preventing the terminal clamps from being pulled off the stack.

Figure 1:
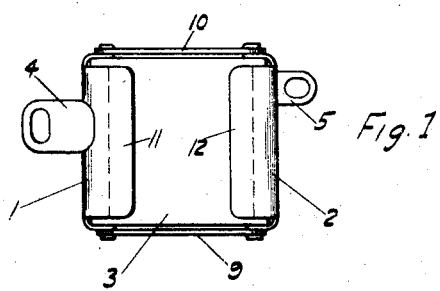
Figure 2:
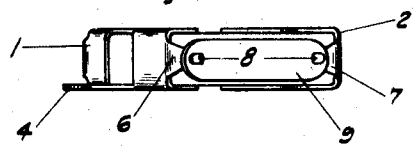

Other objects of this invention will be apparent to one skilled in the art after a reading of the specification and claims taken in connection with the drawing in which, Figure 1 is a plan view of a complete assembled condenser, while Figure 2 is a perspective view looking toward the side and end of the condenser.

In the drawing, 1 and 2 are the clamping members which engage opposite ends of the stack 3. The stack 3 is made up of alternate layers of mica and metal foil of any suitable character, the alternate foils protruding at the ends and these protruding ends of the foils are bent over so as to be engaged by the clamps 1 and 2 which therefore serve as electrical terminals. Lugs 4 and 5 preferably, integral with the terminal clamps 1 and 2 being provided for mounting the condenser. The terminal clamp 1 is provided with a pair of ears 6 and the terminal clamp 2 with a corresponding pair of ears 7. These ears are so constructed that their ends 8 are adapted to pass through perforations in two side members 9 and 10. These side members 9 and 10 are of strong insulating material and as the ends 8 of the ears 6 and 7 are bent over, as shown in Fig. 2, tension is applied to the terminal clamps 1 and 2 thereby holding them securely in position on the stack 3. As shown in the drawing, I prefer to mount the members 9 and 10 on opposite sides of the condenser stack in order to keep the thickness to a minimum, although, it is to be understood that an equivalent arrangement may be placed on the top and bottom of the stack engaging the lips 11 and 12 of the terminals 1 and 2, although, I have found it more convenient to place them on the sides of the stack as illustrated, particularly, where the lips 11 and 12 approach relatively near to each other as they may in some arrangements of a condenser. It is to be understood that members 9 and 10 may have metal eyelets, if desired, to receive the ends 8, but, I have found with suitable material eyelets are not necessary.

Other modifications in details will suggest themselves, but I do not wish to be unduly limited in carrying out my improvements.

Having thus described my invention what I claim is:

1. An electrical condenser comprising a stack of insulating and conducting sheets, a pair of clamps embracing opposite ends of said stack and in electrical connection with said conducting sheets at the respective ends and holding members of insulating material independent of any members embraced by said clamps connected between said clamps.

2. An electrical condenser comprising a stack of insulating and conducting sheets, a pair of clamps embracing opposite ends of said stack and in electrical connection with said conducting sheets at the respective ends and at least one member of insulating material independent of any members embraced by said clamps connected between said clamps and acting to hold the clamps securely on the stack.

3. An electrical condenser comprising a stack of insulating and conducting sheets, the latter alternately extending at opposite ends of the stack beyond the insulating sheets, a pair of clamps embracing opposite ends of said stack and in electrical connection with said conducting sheet extensions and holding members independent of any members embraced by said clamps lying along the opposite sides of the stack and engaging said clamps.

4. An electrical condenser comprising a stack of insulating and conducting sheets, the latter alternately extending at opposite ends of the stack beyond the insulating sheets, a pair of clamps embracing opposite ends of said stack and in electrical connection with said conducting sheet extensions and thin strips of insulating material lying along the opposite sides of the stack and connected to opposite ends of said clamps.

5. An electrical condenser comprising a stack of insulating and conducting sheets, the latter alternately extending at opposite ends of the stack beyond the insulating sheets, a pair of clamps embracing opposite ends of said stack and in electrical connection with said conducting sheet extensions, said clamps having ears bent around the opposite sides of the stack and a pair of insulating strips lying along the opposite sides of the stack and engaged by said ears for the purpose described.

6. An electrical condenser comprising a stack of insulating and conducting sheets, a pair of terminal clamps embracing opposite ends of said stack and in electrical connection with said conducting sheets, said clamps having lugs for mounting the condenser and bendable ears extending from said clamps and strips of insulating material having perforations through which said ears pass, said ears then being bent over the ends of the strips.

In testimony whereof, I affix my signature.

EDWARD B. NOWOSIELSKI.